73-658 SR SEARCH ROOM
XR 3,048,775
SUBSTITUTE FOR MISSING XR
Aug. 7, 1962 R. CALVERT 3,048,775
APPARATUS FOR MEASURING SMALL DISTANCES
Filed Jan. 9, 1959
CROSS REFERENCE
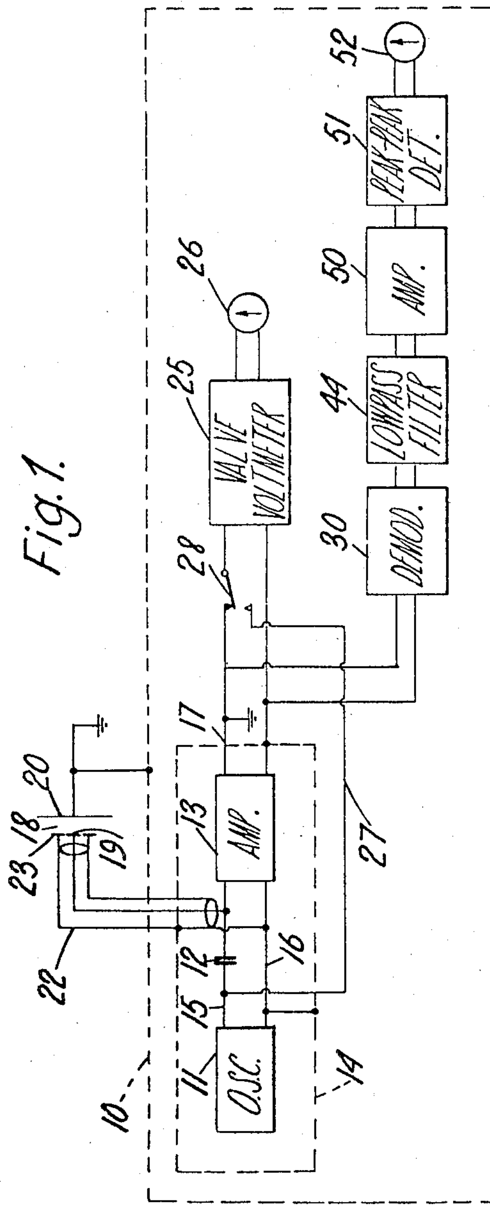
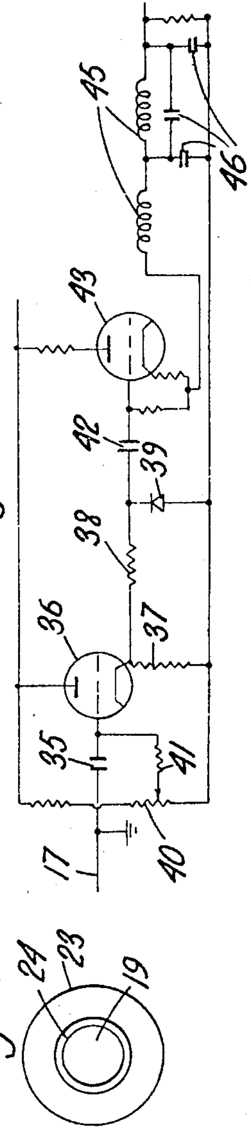

3,048,775
Patented Aug. 7, 1962

3,048,775

APPARATUS FOR MEASURING SMALL DISTANCES

Raymond Calvert, Chessington, England, assignor to The Wayne Kerr Laboratories Limited, Surrey, England, a British company Filed Jan. 9, 1959, Ser. No. 785,846
Claims priority, application Great Britain Jan. 10, 1958
6 Claims. (Cl. 324—61)

This invention relates to apparatus for measuring small distances and/or measuring the amplitude of mechanical vibrations.

According to one aspect of this invention, apparatus for measuring the spacing between a pair of plates of a capacitor comprises a high gain amplifier arranged so that the capacitor may be connected as a feedback circuit across the amplifier to feed a current into the amplifier input dependent on the amplifier output voltage, a source of alternating current of constant amplitude coupled to the amplifier input in opposition to the feedback current and indicating means coupled to the amplifier output. The plates of the capacitor may be formed by or attached to two members whose spacing is to be measured or, as is generally more convenient, one of the plates may be formed as a movable probe the spacing of which from a fixed metallic member may be determined by means of this apparatus. It will be appreciated that the net input to the amplifier will depend on the difference of the constant current input from said source and feedback current and the circuit will balance itself so that the net input to the amplifier is at the appropriate level to give the required feedback. Provided the gain of the amplifier is sufficiently high, the net input voltage to the amplifier will be very small compared with the output voltage and thus the current through the feedback circuit may then be assumed to be equal to the constant current from the aforementioned source. For given dimensions of plates of the capacitor, the voltage at the amplifier output will thus be a measure of the spacing of the plates. There is no problem in making amplifiers of very high gain, as more than one amplifying stage may be used if necessary, and thus it is readily possible to make the current through the capacitor equal to the constant current from said source. Thus an indicating meter for measuring the output voltage may be calibrated to give a direct reading meter indication of the distance between the plates of the capacitor. This arrangement has the advantage that, provided the amplifier is linear, the output voltage is linearly proportional to the required spacing.

The aforementioned constant current input is conveniently obtained from a constant voltage alternating supply source with circuit means for feeding the output from the supply source through a second capacitor to the input of the amplifier.

Considered from another aspect, apparatus according to the invention for measuring small distances comprises a high gain amplifier having a feedback circuit for the amplifier including a first capacitor having two plates the spacing of which is to be measured, a constant voltage alternating supply source, circuit means for feeding the output from said supply source through a second capacitor into the input of the amplifier, and indicating means coupled to the amplifier output.

As indicated above, one of the plates of the first capacitor, i.e. the capacitor of which the plate spacing is to be measured, may be formed by a movable probe unit. Preferably such a movable probe unit is arranged to constitute the plate coupled to the amplifier input; the other plate i.e. the member the spacing of which from the probe is to be measured, is then coupled to the amplifier output. This arrangement has the advantage that the movable plate forming the capacitive electrode in the probe unit may be surrounded by a guard plate. The capacitive electrode plate and the guard plate may then be connected to the two input terminals of the amplifier. As explained above, provided the amplifier gain is high enough, the system will balance with negligible input voltage to the amplifier and hence the guard plate will be at substantially the same potential as the capacitive electrode of the probe unit. By surrounding the capacitive electrode with a guard plate in this manner, it may thus be ensured that, if the probe unit is placed near a large conductive member, the direction of the electric field between the capacitive electrode and the conductive member will be substantially uniform and at right angles to the surfaces of the electrode without any edge effects at the edges of the capacitive electrode.

For measuring the distance of the probe from a metallic object the amplifier output voltage may be measured directly and indicated, for example, by a meter as explained above. For measuring variations in distance such as, for example, the amplitude of mechanical vibrations, the variations in the output voltage may be measured and this may readily be done by ensuring that the alternating voltage supply source has a frequency much higher than the frequency of these variations and then applying the amplifier output to a rectifier to detect the voltage variations appearing as a modulation of the alternating output. The output of the rectifier may be applied to a direct-reading indicator for indicating the amplitude of this detected output.

In one form of the invention, the oscillator develops an alternating output voltage with respect to what may conveniently be termed the neutral line and which is constituted by a conductive metallic container forming a box surrounding the oscillator and amplifier. This alternating output voltage is applied to one plate of a capacitor constituting the aforementioned second capacitor. This capacitor may be a fixed capacitor. The other plate of this capacitor is connected to one input terminal of the amplifier the other input terminal of which is connected to the neutral line. One output terminal of the amplifier is likewise connected to the neutral line and the other is connected to the feedback circuit which includes the capacitor of which the plate spacing is to be measured. For measuring the spacing of a probe from a conductive member, the latter is connected to the output terminal of the amplifier remote from the neutral line and, in conjunction with an electrode of the probe, forms a capacitor. This probe electrode is connected to the input terminal of the amplifier remote from the neutral line and is surrounded by a guard ring connected to the neutral line. A voltage measuring indicator is connected across the output of the amplifier.

It frequently occurs that the apparatus, the spacing of which from the probe is to be measured, is earthed and in that case, using the above described arrangement, the neutral line cannot be earthed. In this case the aforementioned metallic container constituting the neutral line may be enclosed within a second box which is earthed. The probe is connected to the amplifier input by a coaxial cable passing through this outer box and insulated therefrom, the inner conductor of the coaxial cable leading to the capacitive electrode of the probe and the outer conductor to the guard ring. With this construction the output from the amplifier is applied between the inner and outer containers and thus will feed any stray capacity between these containers. This capacity will not therefore affect the indication obtained.

The above described embodiment of the invention may also be used for measuring the amplitude of vibration of a member with respect to the probe by arranging that the frequency of the oscillator feeding the amplifier is much higher than the vibration frequency and by providing a rectifier for detecting the modulation on the alternating output of the amplifier due to the vibration. Provided the rectifier operates as a linear detector, the detected output will be linearly proportional to the amplitude of vibration no matter what is the mean spacing of the vibratory member from the probe. Variations of the mean spacing will not affect the relationship between the detected output and the amplitude of vibration. Hence such an arrangement can be used for measuring the amplitude of vibration and can be calibrated directly without requiring any measurement of the mean spacing of the member from the probe.

The following is a description of one embodiment of the invention, reference being made to the accompanying drawings in which:

FIGURE 1 is a block diagram of one form of distance and vibration amplitude measuring equipment;

FIGURE 2 is an end view of a probe for use in the equipment of FIGURE 1; and

FIGURE 3 is a circuit diagram illustrating a detector circuit employed in the apparatus of FIGURE 1.

The drawings illustrate an apparatus for determining the distance of a probe from a conductive structure and also for measuring the amplitude of vibration of the structure. In use the probe is fixed at some convenient distance from the structure and utilised to determine the distance from the structure and, if required, the variations in distance. It might be used, for example, for measuring tool wear or errors in setting of machine tools or for the measurement of vibration of a moving part such as a rotating shaft.

The measurement is effected by determining the capacitance or variation in capacitance between a capacitive plate of the probe and the aforementioned conductive structure. For the present apparatus, this structure must be earthed, as in fact it would generally be in most cases. As shown in FIGURE 1, the apparatus comprises an outer earthed casing 10 within which is contained an oscillator 11 which in a typical case gives an output at a frequency of 50 kc./s. This oscillator is arranged to give a constant voltage output. This output is fed through a standard capacitor 12 to the input of a high gain amplifier 13. For reasons which will be explained later, the oscillator output cannot be an output voltage with respect to earth and, in this apparatus, the oscillator and amplifier are arranged within an inner conductive shielding box 14 containing the oscillator and amplifier. The oscillator output is developed on an output lead 15 as a voltage with respect to a lead 16 connected to this box 14. Thus one output terminal of the oscillator 11 is connected through the capacitor 12 to a first input terminal of the amplifier 13 and the other oscillator output terminal is connected by the lead 16 to the second amplifier input terminal. The amplifier 13 has to have a phase reversal and is conveniently formed of an odd number, for example three, stages of capacity-resistance coupled amplifier valves. The output of the amplifier is developed on a lead 17 as a potential with respect to the aforementioned conductive box 14 and this output is fed back to the input through a capacitor 18, one plate of which is constituted by a capacitive plate 19 of the probe and the other plate 20 by the body whose distance from the probe is to be measured. The probe plate 19 is connected to the aforementioned first input terminal of the amplifier 13 by a coaxial cable 22, the outer conductor of which is connected to the aforementioned box 14. This outer conductor is also connected to a guard ring 23 around the probe capacitive plate 19, being separated therefrom by a thin ring of dielectric material 24 (FIGURE 2). It will be understood that the plate 19 and guard ring 23 in practice may be made very small, the diameter being of the same order as the distance to be measured. The output lead 17 of the amplifier is earthed to complete a feedback circuit through the earthed plate 20 of the capacitor 18.

Since the amplifier 13 is a high gain amplifier with negative feedback through the capacitor 18, the input voltage to the amplifier remains very small with the feedback current balancing the input current from the oscillator 11. Hence the output voltage of the amplifier will bear a ratio to the input voltage equal to the ratio of the capacitance of the capacitors 18 and 12. Since the output voltage of the oscillator 11 is constant, the current through the standard capacitor 12 is constant and the voltage at the amplifier output will be inversely proportional to the capacitance of capacitor 18 and hence directly proportional to the spacing between the plate 19 and the body 20, that is to say the distance which is to be measured. The proportionality factor of this ratio may be calculated knowing the area of the probe plate 19 (which is made much smaller than the surface area of the body 20), the capacitance of capacitor 12 and the output voltage of the oscillator 11. The output voltage of the amplifier 13 is measured by an average reading valve voltmeter 25 having an indicating meter 26 which may be calibrated directly in units of distance. A test circuit 27 with a switch 28 is provided for feeding the output of the oscillator 11 directly to the valve voltmeter input so that the latter measures directly the potential applied to the standard capacitor 12, so providing an overall check. It may be noted that, by arranging the amplifier to have a large feedback through the capacitor 18, the amplifier gain will be virtually unaffected by changes in valve or circuit parameters and, although provision may be made for adjusting the gain of the amplifier when the above-described overall check is made, it is found that such adjustment is seldom necessary.

Since the input voltage across the amplifier is substantially zero, due to the high gain of the amplifier, the guard ring 23 is at substantially the same potential as the plate 19 of the probe so ensuring that the flux between the probe plate 19 and the plate 20 is normal to the surface of the plate 19. The coaxial cable and guard ring 23 shield the probe plate 19 from any stray capicitance to earth. Capicitance between the guard ring 23 and earth or between the outer conductor of the cable 22 and earth (including the capacitance between the inner box 14 and the earthed casing 10) is immaterial since this capacitance is effectively in shunt across the oscillator output and will be charged by the oscillator without affecting the potential at the input terminals of the amplifier. It is for this reason that the probe is preferably connected to the amplifier input and the plate 20 to the output, since, if the probe were connected to the amplifier output and the plate 20 to the input, any stray capacitance to earth would have to be charged by the amplifier output.

For measuring, the amplitude of vibration of output of the amplifier 13 is fed to a linear detector 30 for detecting any modulation on the carrier frequency, that is to say the frequency of the oscillator 11. Preferably the form of detector illustrated in FIGURE 3 is employed, in which the earthed output lead 17 from the amplifier 13 feeds the amplifier output through the capacitor 35 to the grid of a cathode follower valve 36. The output developed across the cathode load resistor 37 is applied through a resistor 38 to a Zener diode 39 which is biassed so that it is normally just at the point where, when the reverse potential is increased, the diode will conduct heavily in accordance with the well known Zener effect. This bias is set by means of an adjustable potentiometer 40 to which the grid of the valve 36 is connected through a resistor 41. The output from the diode 39 is fed through the capacitor 42 to the control grid of a further cathode follower valve 43 feeding a low pass filter 44 constituted by inductances 45 and capacitances 46 in the cathode circuit. This form of demodulator is described and claimed in British Patent No. 863,397, filed January 5, 1959, and published March 22, 1961, and, because of the very low impedance of the Zener diode when conductive, enables accurate demodulation to be obtained even when the modulation frequency approaches the same order as the carrier frequency. Using a 50 kc./s. oscillator as oscillator 11, the detector circuit 30 using a Zener diode can give accurate detection over a modulation frequency range up to 10 or 15 kc./s. The output of the Zener diode detector will thus consist of uni-directional half cycles of the carrier frequency with the amplitude varying according to the spacing of the plate 19 from the plate 20. The low pass filter 44 is arranged to reject the carrier frequency, that is to say, the frequency of the oscillator 11 so that the output of the low pass filter will, if the plate 20 is vibrating relative to the probe, consist of a voltage representing the vibration amplitude, the proportionality factor being $$\frac{1}{\pi}$$

that of the input to valve voltmeter 25 since single polarity half cycles are smoothed.

Referring to FIGURE 1, the output from the detector 30 is fed through the low pass filter 44 to an amplifier 50 which is switchable between two alternative gain conditions and which serves to amplify the detected modulation voltage. The amplifier 50 is arranged to have a substantially flat response characteristic up to a frequency of 10 kc./s.; to prevent any residual output at the carrier frequency or the first harmonic thereof, the amplifier may be provided with rejecting tuned circuits. The amplified modulation voltage is then applied to a peak to peak detector 51 and indicated on a current indicating meter 52. This indicating meter thus indicates the amplitude of vibration.

It will be particularly noted that, since the output voltage of the amplifier 13 is directly proportional to the distance to be measured, the variations in voltage in the amplifier output will also be linearly proportional to the vibration amplitude and will be independent of the spacing of the plate 19 from the structure 20. The instrument thus serves to measure both the means spacing and the vibration amplitude directly and the vibration amplitude can be determined, if desired, without measuring the mean spacing. The meter 52 can be calibrated directly to indicate the amplitude of the vibration. Knowing the gain of the amplifier 50, the calibration can be calculated from the probe area and the magnitude of the standard capacitor. The calibration is virtually independent of the gain of the amplifier 13 since the latter is made so high that the system is balanced with negligible input as previously described. The amplifier 50 enables the sensitivity of the vibration indication to be increased if it is required to measure small amplitude vibrations. It will be appreciated that, if only the vibration amplitude is required, there is no necessity to employ the valve voltmeter 25 and indicating meter 26 and the instrument can serve to measure the vibration amplitude without any necessity for measuring the means spacings of the probe from the member 20.

The peak to peak detector 51 may comprise a voltage doubler circuit with two diodes so as to give an output representative of the true peak to peak value and not twice the value of one peak, thereby ensuring that accurate measurements are still obtained even when the vibration consists of unequal displacements about the position of rest. For low vibration frequencies, the detector 51 must have a long time constant to give an output accurately representative of the input. The detector may therefore conveniently be provided with alternative time constant circuits so that, when only higher frequency vibrations are present, a shorter time constant may be used to reduce the time taken for the indicating meter 52 to reach its final value.

If the structure, whose distance from the probe is to be measured, has not a flat surface of sufficient area to co-operate with a flat plate 19 on the probe, the probe may be provided with a capacitive plate suitably shaped in accordance with the structure with which it is to cooperate.

For measuring small irregularities on the surface of a structure, a spring loaded stylus may be moved over the surface and the probe arranged to measure the axial movement of the stylus. The stylus can have a sharp point so that it can enter grooves or the like which would be too small to be measured directly by the probe but the probe can, in such cases, measure accurately the movement of the stylus and hence the depth of the surface irregularities.

I claim:

1. Apparatus for measuring the amplitude of vibration of one plate of a capacitor with respect to the other plate comprising an amplifier having an input circuit and an output circuit, a constant current source of alternating current coupled to said input circuit, a feedback circuit for said amplifier including said capacitor in the feedback path, which feedback circuit is coupled between said output and said input circuit to feed part of the amplifier output into the input circuit in opposition to the signal from said source of alternating current, a rectifier circuit coupled to said amplifier output to detect the voltage variations appearing as a modulation of the alternating output of the amplifier, indicating means coupled to said rectifier circuit to indicate the amplitude of the detected voltage variations, said rectifier circuit comprising a Zener diode, biasing means for maintaining the Zener diode at the break point, means for applying the amplifier output voltage to said diode and an output circuit in shunt across the diode, which output circuit includes a filter for removing signals of the frequency of said alternating current.

2. Apparatus for measuring the amplitude of vibration of one plate of a capacitor with respect to the other plate thereof, comprising the capacitor, an amplifier having an input circuit and an output circuit, said input circuit including a probe electrode constituting one of the plates of the capacitor, a guard electrode surrounding said probe electrode, a constant current source of alternating current coupled to said input circuit, a feedback circuit from said output circuit of said amplifier for the other of said plates to feed part of the amplifier output through the capacitor and said probe electrode into the input circuit to equal the input signal to self-balance the apparatus, means coupling the output circuit of said amplifier to said guard electrode to apply the amplifier output voltage between the guard electrode and said other of said plates, and a rectifier circuit coupled to said amplifier output to detect the voltage variations appearing as a modulation of the alternating output of the amplier, and indicating means coupled to said rectifier circuit to indicate the amplitude of the detected voltage variations.

3. Apparatus according to claim 2 having unearthed box means disposed about said constant current source of alternating current and said amplifier, and an earthed box means disposed about said first box means, rectifier circuit and indicating means.

4. Apparatus according to claim 2, having earthed box means within which said constant current source of alternating current, said amplifier, rectifier circuit and indicating means are located.

5. Apparatus according to claim 2 wherein said guard is a ring of substantially the same potential as said other plate.

6. Apparatus according to claim 2 wherein the output voltage of the amplifier is directly proportional to the distance to be measured.

References Cited in the file of this patent

UNITED STATES PATENTS

| | | |
|---|---|---|
| 2,544,012 | Edelman | Mar. 6, 1951 |
| 2,719,262 | Bousman | Sept. 27, 1955 |
| 2,802,173 | Nisle | Aug. 6, 1957 |
| 2,802,178 | Shafer | Aug. 6, 1957 |
| 2,880,390 | Calvert | Mar. 31, 1959 |
| 2,908,166 | Johnson | Oct. 13, 1959 |
| 2,932,970 | Zito | Apr. 19, 1960 |

FOREIGN PATENTS

| | | |
|---|---|---|
| 513,771 | Great Britain | Oct. 20, 1939 |

OTHER REFERENCES

Konigsberg: "Operational Bridge Gages High Capacitance," Electronics, January 1, 1957, pages 175–177.